US011516211B2

(12) United States Patent
Bulpin (10) Patent No.: US 11,516,211 B2
(45) Date of Patent: Nov. 29, 2022

(54) SYSTEM FOR PROVIDING A SERVICE BASED UPON AUTHORIZATION TOKEN AND VIRTUAL ASSISTANT AND RELATED METHODS

(71) Applicant: CITRIX SYSTEMS, INC., Ft. Lauderdale, FL (US)

(72) Inventor: James Roy Bulpin, Cambridge (GB)

(73) Assignee: CITRIX SYSTEMS, INC., Fort Lauderdale, FL (US)

( * ) Notice: Subject to any disclaimer, the term of this patent is extended or adjusted under 35 U.S.C. 154(b) by 966 days.

(21) Appl. No.: 16/242,649

(22) Filed: Jan. 8, 2019

(65) Prior Publication Data
US 2020/0084205 A1 Mar. 12, 2020

Related U.S. Application Data

(60) Provisional application No. 62/729,938, filed on Sep. 11, 2018.

(51) Int. Cl.
*H04L 9/40* (2022.01)
*G06F 9/451* (2018.01)
(52) U.S. Cl.
CPC .......... *H04L 63/0853* (2013.01); *G06F 9/453* (2018.02); *H04L 63/102* (2013.01)
(58) Field of Classification Search
CPC ............... H04L 63/0853; H04L 63/102; H04L 63/0884; G06F 9/453
See application file for complete search history.

(56) References Cited

U.S. PATENT DOCUMENTS

| 8,577,334 | B1 | 11/2013 | Smith et al. |
| 10,097,729 | B1* | 10/2018 | Brady ................ H04N 1/00403 |
| 10,805,301 | B2* | 10/2020 | Pitchaimani .......... H04L 63/101 |
| 10,848,392 | B2* | 11/2020 | Kapinos ................ H04L 41/22 |
| 11,188,629 | B2* | 11/2021 | Van Den Hoven ..... G06F 21/32 |
| 2014/0104638 | A1* | 4/2014 | Kato ........................ H04N 1/44 358/1.14 |
| 2014/0280757 | A1 | 9/2014 | Tran |

(Continued)

OTHER PUBLICATIONS

Examination Report No. 1 for Standard Patent Application received from IP Australia for Application No. 2019337572 dated Sep. 20, 2021, 3 pages.

(Continued)

*Primary Examiner* — Michael R Vaughan
(74) *Attorney, Agent, or Firm* — Finch & Maloney PLLC (57) ABSTRACT

A system for providing a service may include a user device executing an application. The application may have an authorization token associated therewith to authenticate a given user to the service. The system may also include a server executing the service, and a virtual assistant to receive a request to access the service via the virtual assistant and communicate the request to the server. The server may determine whether the token has been obtained thereat based upon the identifier. When the token has been received by the server, the server may determine whether the token has expired, and when not expired, the server may process the request. When the token has not been received by the server, the server may obtain the token from the user device, and process the request based upon obtaining the token from the user device.

23 Claims, 9 Drawing Sheets

(56) References Cited

U.S. PATENT DOCUMENTS

| | | | |
|---|---|---|---|
| 2015/0172262 A1 | 6/2015 | Ortiz, Jr. et al. | |
| 2016/0259656 A1* | 9/2016 | Sumner | G06F 3/167 |
| 2016/0262017 A1* | 9/2016 | Lavee | H04L 63/083 |
| 2017/0195457 A1 | 6/2017 | Smith, II et al. | |
| 2019/0007525 A1 | 1/2019 | Edward, II et al. | |
| 2019/0124049 A1* | 4/2019 | Bradley | G06F 21/6245 |
| 2019/0132321 A1* | 5/2019 | Pitchaimani | H04W 12/06 |
| 2019/0141031 A1* | 5/2019 | Devdas | H04L 63/18 |
| 2020/0067916 A1* | 2/2020 | Spates, IV | H04L 63/10 |

OTHER PUBLICATIONS

International Preliminary Report on Patentability for Application No. PCT/US2019/050407 dated Mar. 9, 2021, 9 pages.
International Search Report and Written Opinion recieved for PCT Application No. PCT/US2019/050407, dated Dec. 20, 2019. 14 pages.
Examination Report received from Canadian Patent Office for Application No. 3,108,570 dated Feb. 24, 2022 (4 pages).

* cited by examiner

SYSTEM FOR PROVIDING A SERVICE BASED UPON AUTHORIZATION TOKEN AND VIRTUAL ASSISTANT AND RELATED METHODS

RELATED APPLICATION

The present application claims the priority benefit of provisional application Ser. No. 62/729,938 filed on Sep. 11, 2018, the entire contents of which are herein incorporated by reference.

TECHNICAL FIELD

The present disclosure relates to the field of computer networking and communications, and more particularly, to authorization of virtual assistants and related methods.

BACKGROUND

A virtual assistant may be in the form of a software agent that can perform tasks or services for an individual. Capabilities of a virtual assistant are increasingly expanding.

As part of the capabilities of a virtual assistant, the virtual assistant may often access a service on behalf of a user. This cloud service typically cooperates with application programming interfaces of the application associated with the cloud-based account. Accordingly, it may be desirable that the virtual assistant may access the user's account.

Typically, the user's account is accessed by the virtual assistant by pairing the user's account associated with the virtual assistant with the desired service account. Thus, a permanent trust relationship may be established between the virtual assistant and the desired service account, for example, based upon an authorization token.

SUMMARY

A system for providing a service may include a user device associated with a given user from among a plurality thereof and executing an application thereon. The application may cooperate with the service and may have an authorization token associated therewith to authenticate the given user to the service. The system may also include a server configured to execute the service for the plurality of users. A virtual assistant may have an identifier associated therewith and be configured to receive a request from the given user to access the service via the virtual assistant, and communicate the request to the server. The server may be configured to determine whether the authorization token has been received by the server based upon the identifier. When the authorization token has been received by the server, the server may determine whether the authorization token has expired, and when the authorization token has not expired, process the request. The server may be configured to, when the authorization token has not been received by the server, obtain the authorization token from the user device, and process the request based upon obtaining the authorization token from the user device.

The virtual assistant may include a voice-based virtual assistant, for example. The server may be configured to, when the authorization token has not been received by the server, generate a linking code and communicate the linking code to the virtual assistant. The user device may be configured to obtain the linking code and communicate the linking code and the authorization token to the server. The virtual assistant may include a voice-based virtual assistant configured to audibly output the linking code, for example.

The server may be configured to determine whether the authorization token has expired based upon expiration of a threshold time from receipt of the authorization token at the server, and when the authorization token has expired, delete the authorization token from the server. The system may also include an intermediary device configured to cooperate with the user device to obtain the authorization token and communicate the authorization token to the server.

The intermediary device may be configured to communicate an intermediary device identifier. The user device may be configured to communicate the authorization token to the intermediary device based upon the intermediary device identifier, for example.

The intermediary device may be configured to display an optically recognizable code corresponding to the intermediary device identifier. The user device may be configured to obtain the intermediary device identifier based upon the optically recognizable code, for example.

A method aspect is directed to a method of providing a service. The method may include using a server to determine whether an authorization token has been received by the server based upon an identifier associated with a virtual assistant. The authorization token may be associated with an application cooperating with the service for authenticating a given user to the service and to be executed on a user device associated with the given user from among a plurality thereof. The method may also include using the server to, when the authorization token has been received by the server, determine whether the authorization token has expired, and when the authorization token has not expired, process a request from the given user to access the service. The request may be from the virtual assistant. The method may further include using the server to, when the authorization token has not been received by the server, obtain the authorization token from the user device, and process the request based upon obtaining the authorization token from the user device.

A computer readable medium aspect is directed to a non-transitory computer readable medium for providing a service. The non-transitory computer readable medium includes computer executable instructions that when executed by a processor cause the processor to perform operations. The operations may include determining whether an authorization token has been obtained based upon an identifier associated with a virtual assistant. The authorization token may be associated with an application cooperating with the service for authenticating a given user to the service and to be executed on a user device associated with the given user from among a plurality thereof. The operations may also include, when the authorization token has been obtained, determining whether the authorization token has expired, and when the authorization token has not expired, processing a request from the given user to access the service, the request being from the virtual assistant. The operations may also include, when the authorization token has not been obtained, obtaining the authorization token from the user device, and processing the request based upon obtaining the authorization token from the user device.

DETAILED DESCRIPTION

The present description is made with reference to the accompanying drawings, in which example embodiments are shown. However, many different embodiments may be used, and thus the description should not be construed as limited to the particular embodiments set forth herein. Like numbers refer to like elements throughout, and base 100 reference numerals are used to indicate similar elements in alternative embodiments.

As will be appreciated by one of skill in the art upon reading the following disclosure, various aspects described herein may be embodied as a device, a method or a computer program product (e.g., a non-transitory computer-readable medium having computer executable instruction for performing the noted operations or steps). Accordingly, those aspects may take the form of an entirely hardware embodiment, an entirely software embodiment, or an embodiment combining software and hardware aspects.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof.

Figure 1:
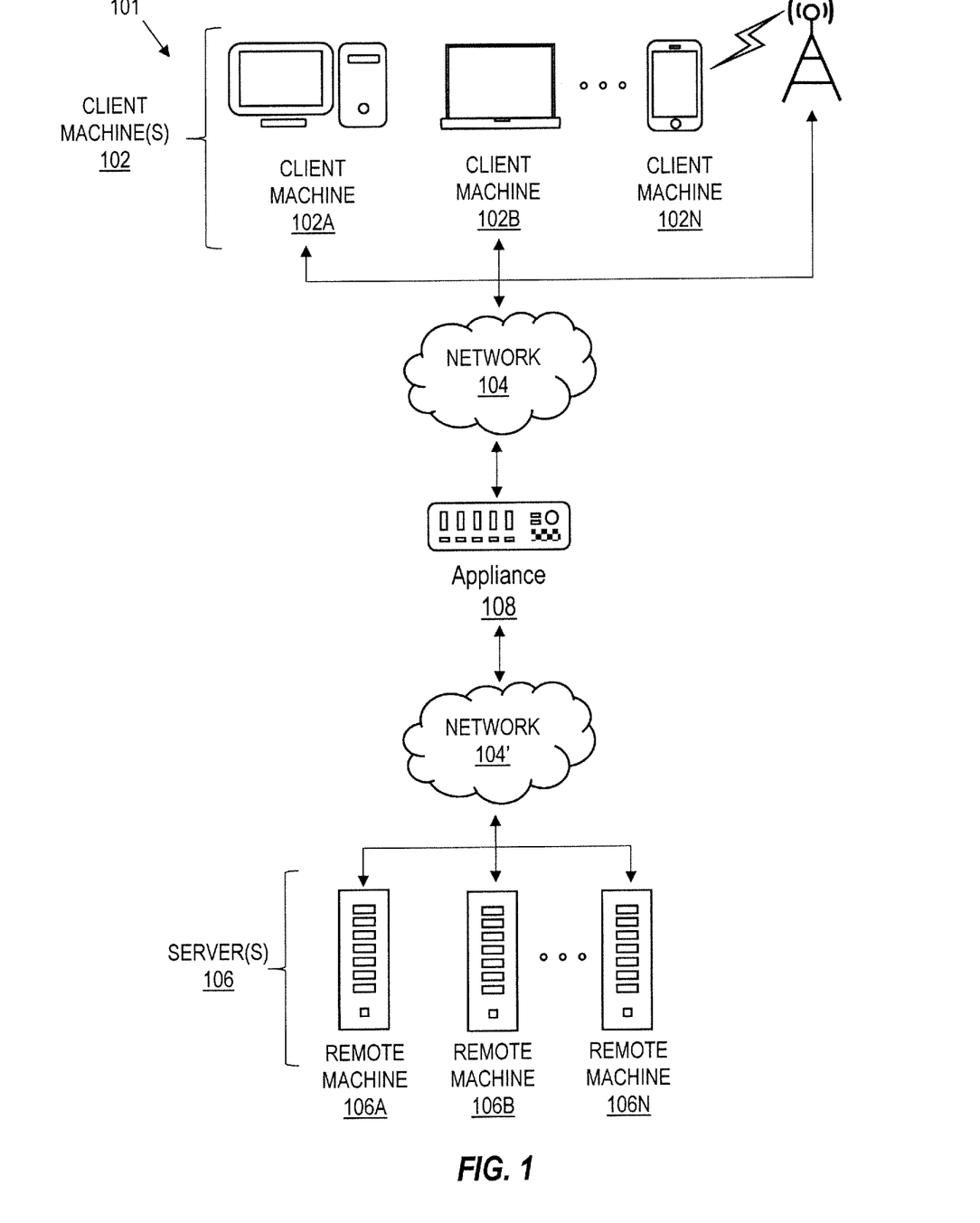
FIG. 1 is a schematic block diagram of a network environment of computing devices in which various aspects of the disclosure may be implemented.

Referring initially to FIG. 1, a non-limiting network environment 101 (i.e. a communication system) in which various aspects of the disclosure may be implemented includes one or more client machines 102a-102n, one or more remote machines 106a-106n, one or more networks 104a, 104b, and one or more appliances 108 installed within the computing environment 101. The client machines 102a-102n communicate with the remote machines 106a-106n via the networks 104a, 104b.

In some embodiments, the client machines 102a-102n communicate with the remote machines 106a-106n via an intermediary appliance 108. The illustrated appliance 108 is positioned between the networks 104a, 104b and may also be referred to as a network interface or gateway. In some embodiments, the appliance 108 may operate as an application delivery controller (ADC) to provide clients with access to business applications and other data deployed in a datacenter, the cloud, or delivered as Software as a Service (SaaS) across a range of client devices, and/or provide other functionality such as load balancing, etc. In some embodiments, multiple appliances 108 may be used, and the appliance(s) 108 may be deployed as part of the network 104a and/or 104b.

The client machines 102a-102n may be generally referred to as client machines 102, local machines 102, clients 102, client nodes 102, client computers 102, client devices 102, computing devices 102, endpoints 102, or endpoint nodes 102. The remote machines 106a-106n may be generally referred to as servers 106 or a server farm 106. In some embodiments, a client device 102 may have the capacity to function as both a client node seeking access to resources provided by a server 106 and as a server 106 providing access to hosted resources for other client devices 102a-102n. The networks 104a, 104' may be generally referred to as a network 104a. The networks 104a may be configured in any combination of wired and wireless networks.

A server 106 may be any server type such as, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; a cloud server; or a server executing an application acceleration program that provides firewall functionality, application functionality, or load balancing functionality.

A server 106 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions.

In some embodiments, a server 106 may execute a remote presentation services program or other program that uses a thin-client or a remote-display protocol to capture display output generated by an application executing on a server 106 and transmit the application display output to a client device 102. In yet other embodiments, a server 106 may execute a virtual machine providing, to a user of a client device 102, access to a computing environment. The client device 102 may be a virtual machine. The virtual machine may be managed by, for example, a hypervisor, a virtual machine manager (VMM), or any other hardware virtualization technique within the server 106.

In some embodiments, the network 104a may be: a local-area network (LAN); a metropolitan area network (MAN); a wide area network (WAN); a primary public network 104a; and a primary private network 104a. Additional embodiments may include a network 104a of mobile telephone networks that use various protocols to communicate among mobile devices. For short range communications within a wireless local-area network (WLAN), the protocols may include IEEE 802.11, Bluetooth, and Near Field Communication (NFC).

Figure 2:
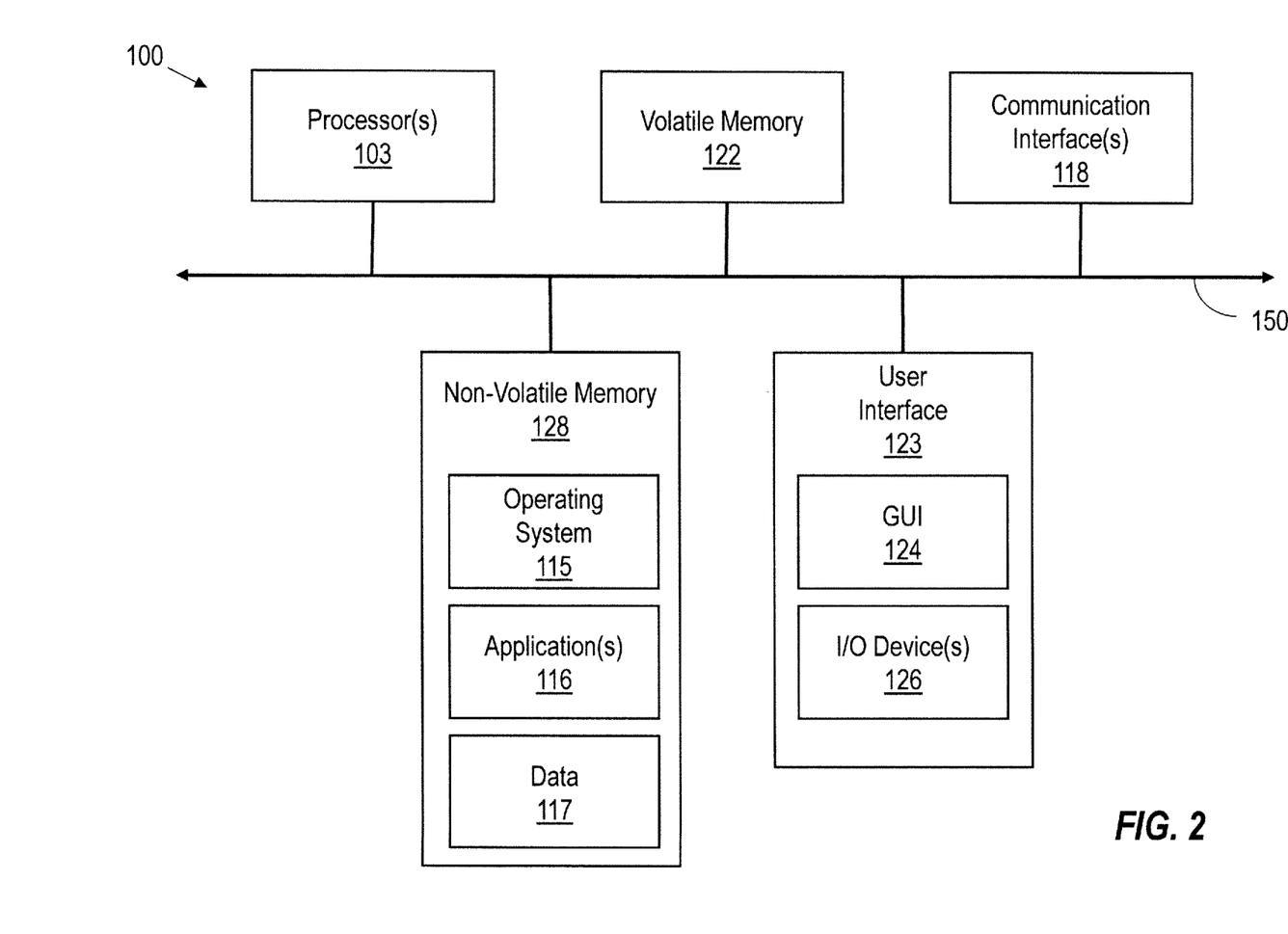
FIG. 2 is a schematic block diagram of a computing device useful for practicing an embodiment of the client machines or the remote machines illustrated in FIG. 1.

FIG. 2 depicts a block diagram of a computing device 100 useful for practicing an embodiment of client devices 102, appliances 108 and/or servers 106. The computing device 100 includes one or more processors 103, volatile memory 122 (e.g., random access memory (RAM)), non-volatile memory 128, user interface (UI) 123, one or more communications interfaces 118, and a communications bus 150. The non-volatile memory 128 may include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

The user interface 123 may include a graphical user interface (GUI) 124 (e.g., a touchscreen, a display, etc.) and one or more input/output (I/O) devices 126 (e.g., a mouse, a keyboard, a microphone, one or more speakers, one or more cameras, one or more biometric scanners, one or more environmental sensors, and one or more accelerometers, etc.).

The non-volatile memory 128 stores an operating system 115, one or more applications 116, and data 117 such that, for example, computer instructions of the operating system 115 and/or the applications 116 are executed by processor(s) 103 out of the volatile memory 122. In some embodiments, the volatile memory 122 may include one or more types of RAM and/or a cache memory that may offer a faster response time than a main memory. Data may be entered using an input device of the GUI 124 or received from the I/O device(s) 126. Various elements of the computer 100 may communicate via the communications bus 150.

The illustrated computing device 100 is shown merely as an example client device or server, and may be implemented by any computing or processing environment with any type of machine or set of machines that may have suitable hardware and/or software capable of operating as described herein.

The processor(s) 103 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A processor may perform the function, operation, or sequence of operations using digital values and/or using analog signals.

In some embodiments, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory.

The processor 103 may be analog, digital or mixed-signal. In some embodiments, the processor 103 may be one or more physical processors, or one or more virtual (e.g., remotely located or cloud) processors. A processor including multiple processor cores and/or multiple processors may provide functionality for parallel, simultaneous execution of instructions or for parallel, simultaneous execution of one instruction on more than one piece of data.

The communications interfaces 118 may include one or more interfaces to enable the computing device 100 to access a computer network such as a Local Area Network (LAN), a Wide Area Network (WAN), a Personal Area Network (PAN), or the Internet through a variety of wired and/or wireless connections, including cellular connections.

In described embodiments, the computing device 100 may execute an application on behalf of a user of a client device. For example, the computing device 100 may execute one or more virtual machines managed by a hypervisor. Each virtual machine may provide an execution session within which applications execute on behalf of a user or a client device, such as a hosted desktop session. The computing device 100 may also execute a terminal services session to provide a hosted desktop environment. The computing device 100 may provide access to a remote computing environment including one or more applications, one or more desktop applications, and one or more desktop sessions in which one or more applications may execute. Additional descriptions of a computing device 100 configured as a client device 102 or as a server 106, or as an appliance intermediary to a client device 102 and a server 106, and operations thereof, may be found in U.S. Pat. Nos. 9,176,744 and 9,538,345, which are incorporated herein by reference in their entirety. The '744 and '345 patents are both assigned to the current assignee of the present disclosure.

Figure 3:
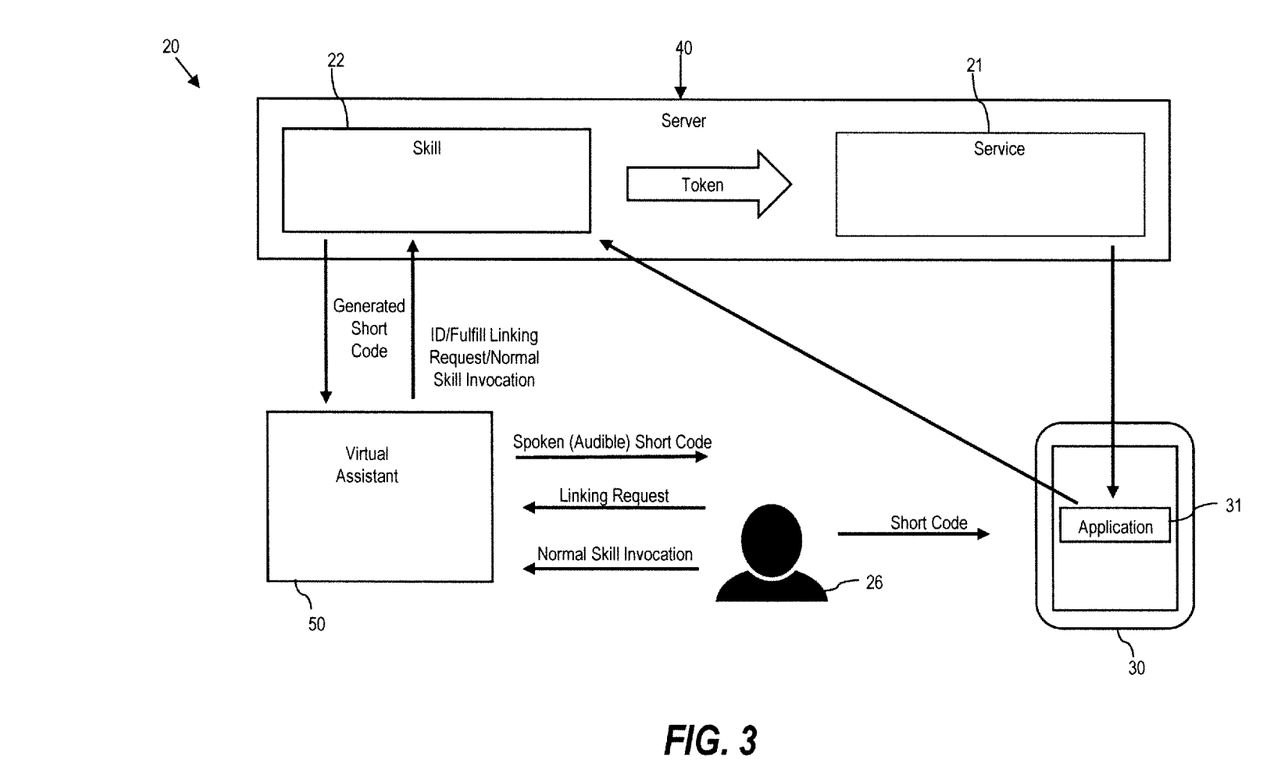
FIG. 3 is a schematic diagram of a system for providing a service in accordance with an embodiment.

Referring now to FIG. 3, a system 20 for providing a service 21 will now be described. As will be appreciated by those skilled in the art, the embodiments of the system 20 described herein may be particularly advantageous for enabling a service (e.g., a cloud service) to act on behalf of a user. More particularly, the system 20 may permit a user of a mobile device that is currently authenticated to an online service to temporarily provide an access token for that service to a cloud service (e.g., a service that provides fulfillment for a virtual assistant skill). In other words, the system 20 may provide transient account linking for cloud-based virtual assistant services without permanently granting access or authority. Moreover, the system 20 may provide the ability for users to have a virtual assistant skill access relevant user accounts without the user having an account or relationship with a virtual assistant itself. In other words, the system 20 is in contrast to previous approaches whereby if other users perform a same query on a given virtual assistant, then the skill accesses the original user's account and not the account of the user making the request (which may lead to data leakage).

While virtual assistant vendors have attempted to mitigate the above-noted user problem, by recognizing different users' voices, for example, and allowing the virtual assistant to be paired separately for each user, this approach may only be relatively successful in domestic cases, where the virtual assistant may be used by a small number of users, and the set of users does not change on a regular basis. However, the above described mitigation technique may effectively address the scenario where each space (office, meeting room, hot desk, etc.) is in a company building and equipped with a virtual assistant, and any employee of the company may use any space at any time. The number of users is relatively large and changes relatively quickly compared to the domestic cases noted above. This means that enrolling users in voice recognition schemes may be considered impractical, and the chances of incorrect recognition are increased. Additionally, the permanent pairing of the entire set of virtual assistants, for example, smart speakers, with the entire staff population's accounts may be considered unwieldy. As such, the systems and methods set forth herein advantageously provide improved performance within a virtualized and/or enterprise environment when enabling a service to act on behalf of a user.

The system 20 addresses these scenarios that involve users having transient relationships with a specific virtual assistant rather than being permanently paired with a virtual assistant. This means that the normal manner of pairing may be considered a poor fit. Instead, it may be desirable to have the cloud service that fulfills the virtual assistant skill be temporarily "loaned" an authorization token that can be used to act on behalf of the user, e.g. calling APIs on a service, for skill invocations that are performed on a specific device.

The system 20 may include a user device 30 associated with a given user 26 from among a plurality of users. The user device 30 is illustratively in the form of a smartphone. The user device 30 may be in the form of another type of device, such as, for example, a desktop computer, mobile wireless communications device, tablet computer, or wearable device. The user device 30 executes an application 31 (e.g., a file sharing application, such as Dropbox® or Sharefile®). The application 31 has an authorization token 25 associated therewith to authenticate the given user 26 to the service 21.

The service 21 may be in the form of an online service that a skill 22 interacts with via an application programming interface (API) whereby per-user authorization is desired. The skill 22 may be a cloud service that provides the fulfillment (business logic) for another device, for example, a virtual assistant, smart speaker, and/or chatbot. In other words, a skill 22 may be the operational capabilities of a device. For example, the skill 22 may include operations that search a given user's online files (associated with an account) for documents according to a voice query. Other exemplary skills 22 may include game skills, content skills, voice-based skills, and music skills, for example, operations for responding to a voice-based request to play a song.

The system 20 also includes a server 40 for executing the service 21 for the users 26. The server 40 includes a processor 41 and an associated memory 42. While operations of the server 40 are described herein, it will be appreciated that the operations are performed based upon cooperation between the processor 41 and the memory 42. Moreover, while the server 40 is described as performing functions of or including the service 21 and the skill 22, those skilled in the art will appreciate that these functions may be performed by more than one physical server or computer and may be remote from one another.

The system 20 also includes a virtual assistant 50, for example, any device that may invoke the skill 22. The virtual assistant 50 has an identifier associated therewith, for example, a unique identifier. The virtual assistant 50 may be in the form of a smart speaker, for example. The virtual assistant 50 may be an artificial intelligence-powered virtual assistant that is primarily available on mobile and smart home devices. In other words, the virtual assistant may be a device, such as an Amazon Echo®, that invokes the skill 22. The identifier identifies the virtual assistant 50, for example, when invoking a skill 22.

Figure 4:
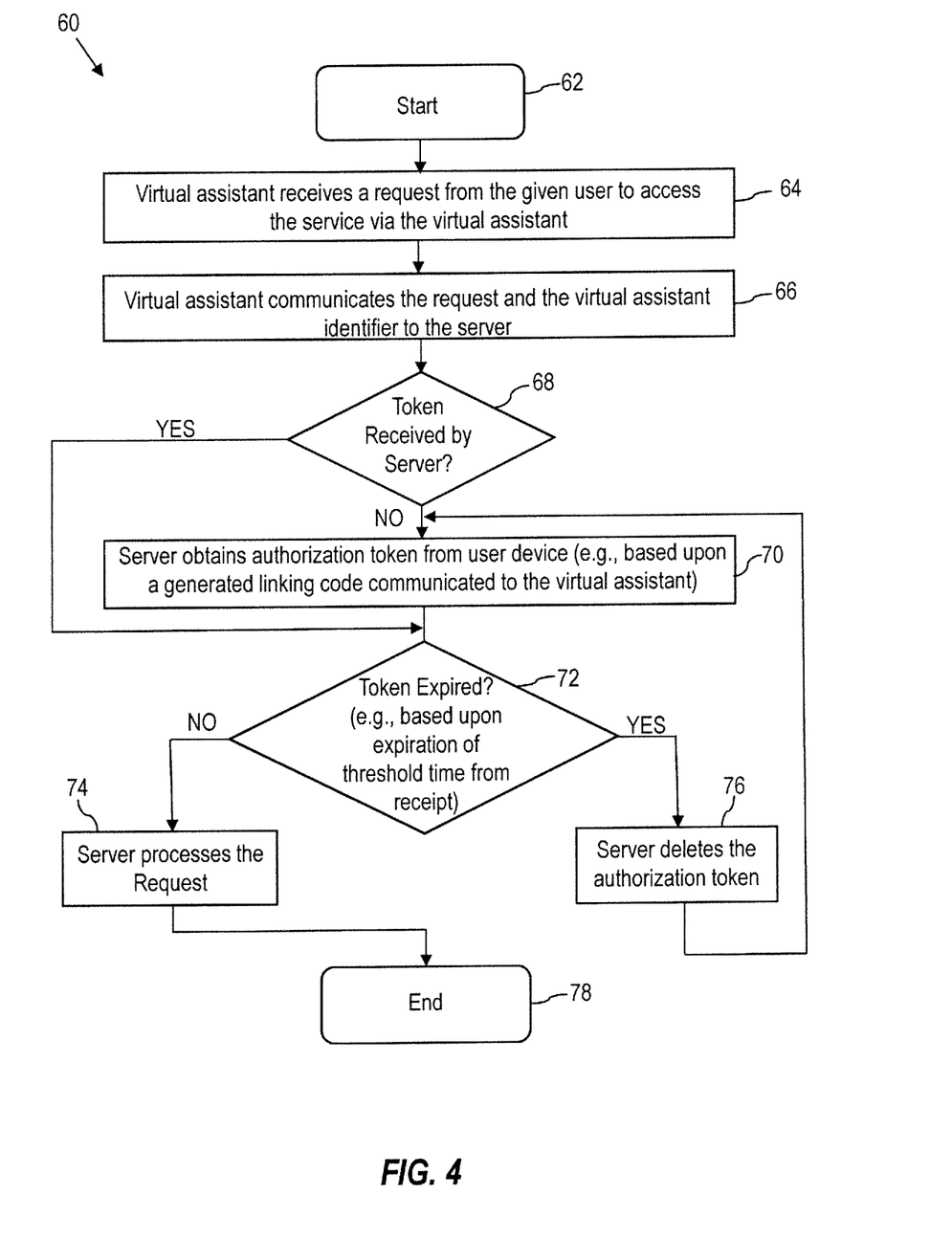
FIG. 4 is a flow diagram illustrating operation of the system of FIG. 3.

Referring now to the flowchart 60 in FIG. 4, beginning at Block 62, operation of the system 20 in terms of providing the service 21 and authenticating the user to the service 21 via the virtual assistant 50 will now be described. It should be noted that the operations described herein are based upon the given user 26 having already authenticated themselves to the service 21 using the corresponding application 31 on the user device 30, and therefore the user device possesses the corresponding authorization token 25 that can be used to access the service as the given user (e.g., based upon credentials associated with the given user).

At Block 64, the virtual assistant 50 receives a request from the given user 26 to access the service 21 via the virtual assistant. For example, the given user 26 may audibly request, from the virtual assistant 50, a search of online account files. In other instances, the given user 26 may make the request to interact with the service 21 by audibly speaking, "Virtual Assistant, ask Service Provider A to search my files." The virtual assistant 50 may communicate the request to the server 40, for example, based upon one or more communications networks, such as the Internet (Block 66).

The server 40, at Block 68, determines whether the authorization token 25 has been received by the server based upon the identifier. More particularly, the skill 22 processes the request based upon the identifier that was included in the request. The skill 22 performs a lookup or matching operation to determine whether an authorization token 25 for the virtual assistant 50 to access the application 31 is already stored at the server 40 (e.g., the server or service 21 has a "temporary loan" of an authorization token for the virtual assistant).

If, at Block 68, the server 40 determines that the authorization token 25 has been received by the server 40, the server 40 determines, at Block 72 whether the authorization token has expired. As will be appreciated by those skilled in the art, the authorization token 25 has an expiration associated therewith. Whether the authorization token 25 has expired or not may be based upon expiration of a threshold time from receipt of the authorization token at the server 40. When the authorization token 25, at Block 72, has not expired, the server 40 processes the request (Block 74). When the authorization token 25 has expired, at Block 72, the server 40 may delete the authorization token (Block 76) and obtains a new authorization token, for example, as described below.

If at Block 68, the server 40 determines that the authorization token 25 has not been received by the server 40, the server 40 thus does not know which user is making the request, and has no mechanism to authorize access to or fulfill the request or service APIs. Accordingly, at Block 70, the server 40 obtains the authorization token 25 from the user device 30. More particularly, to authenticate the given user 26 to the service 21 via the virtual assistant 50, the server 40 or skill 22 may generate a linking code. The linking code may be a short, unique, temporary code (e.g., a 6-digit number) to refer to the specific virtual assistant 50 that is desirous of accessing the service. The skill 22 stores this code and the identifier of the virtual assistant 50 for future use. A linking code, for example, in the form of a short code may be used because in some embodiments it may be provided audibly to the given user 26.

The server 40 or skill 22 may cooperate with the virtual assistant 50 to generate an audible instruction (e.g., via synthesized voice emitted from the virtual assistant) that directs the user to operate the user device 30 to communicate the authorization token 25 to the skill 22 or server. The audible instruction includes the linking or short code described above. In some embodiments, the linking or short code may not be audibly communicated and may be communicated electrically or visually (e.g., via a display, email, etc.).

In one exemplary implementation, the given user 26 may open or execute the application 31 on their user device 30 and select the option to "authorize the skill." The given user 26 may then enter the short code provided by the skill 22 or server 40. The application 31 on the user device 30 sends the existing authorization token 25 and the short code to the skill 22 or server 40 via a known API endpoint.

On receiving the authorization token and short code from the user device 30, the server 40 or skill 22 performs a look up or matching operation to determine whether the unique identifier associated with the virtual assistant 50 corresponds to the short code (e.g., obtained as described above). The server 40 stores the unique identifier associated with the virtual assistant 50, the authorization token 25, and a threshold expiration time (for example, 15 minutes from the current time).

Once the authorization token 25 has been received by the server 40, the given user 26 may then invoke the skill 22 from the virtual assistant 50, e.g. "Virtual Assistant, ask Service Provider A to find spreadsheets I edited yesterday." The skill 22, based upon on receiving this fulfillment request, uses the unique identifier associated with the virtual assistant 50 and that is included in the request to look up the stored authorization token 25 sent from the application 31 on the user device 30.

Upon receiving the authorization token 25 from the user device 30, the server 40 may determine, similarly to that described above, whether the newly obtained authorization token is valid or has not expired (Block 72). If the newly obtained authorization token 25 has not expired (Block 72), the server 40 or service 21 processes the request based upon receipt of the authorization token from the user device 30 (Block 74). More particularly, if the authorization token 25 has not expired, the skill 22 or server 40 then performs the requested action, using the authorization token to call the service APIs as desired. If the authorization token 25 has expired (Block 72), the authorization token is deleted (Block 76) and a new authorization token may be obtained as described above (Block 70). In some embodiments, the server 40 may not determine whether a newly obtained authorization token 25 is valid or has not expired, as it may be assumed a newly obtained authorization token is valid. Operations end at Block 78.

It should be noted that in some embodiments, another mechanism may be provided to communicate the authorization token 25 to the server 40. For example, the unique identifier of the virtual assistant 50 may be provided as a printed quick response (QR) code or barcode (or other printed code or imager) associated with (e.g., physically attached) the virtual assistant. The user device 30 may scan the QR code and provide the unique identifier to the application 31, and the application, in turn, may communicate the identifier and the authorization token 25 to the server 40 or skill 22.

Figure 5:
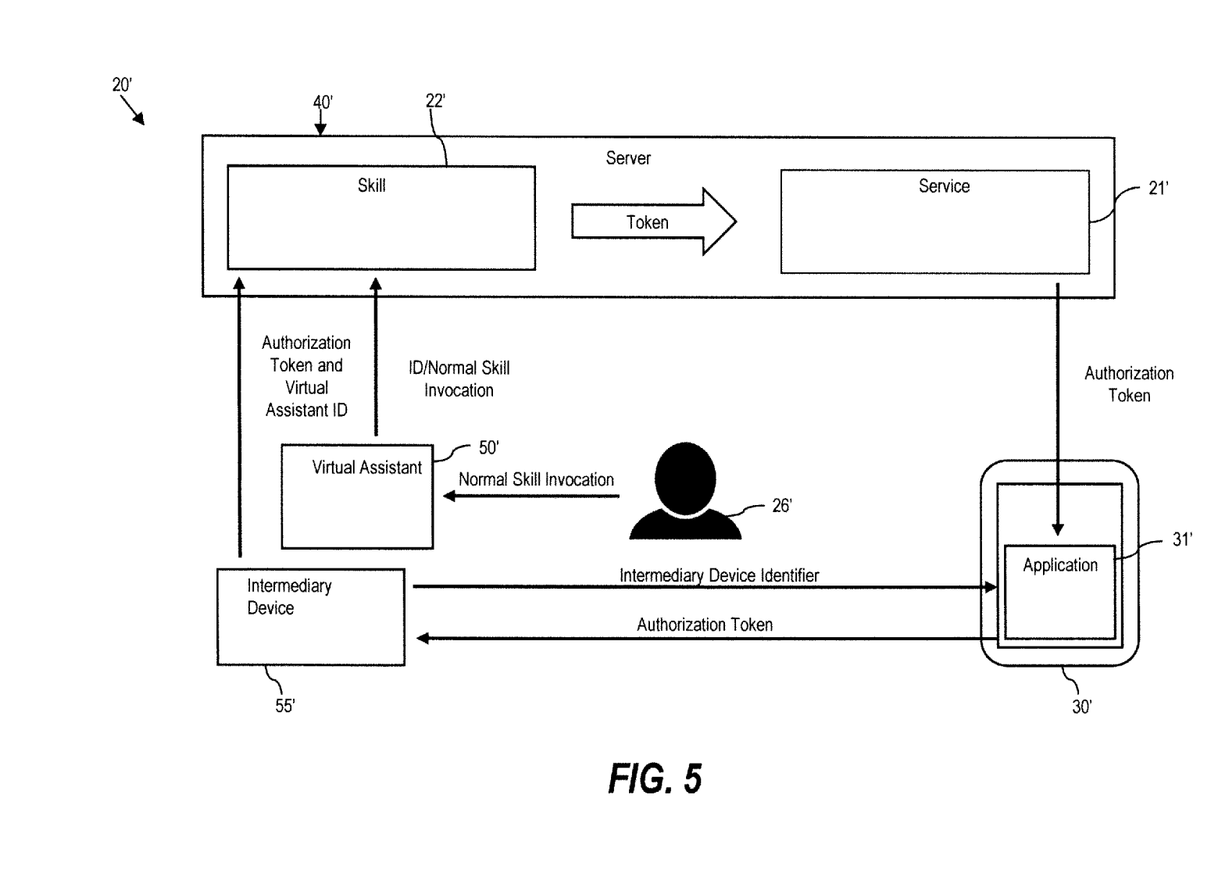
FIG. 5 is a schematic diagram of a system for providing a service in accordance with another embodiment.

Referring now to FIG. 5, operation of a system 20' in terms of providing the service 21' and authenticating the user to the service via the virtual assistant 50' according to another embodiment will now be described. In the present embodiment, it is assumed that the virtual assistant 50' is physically proximate to an intermediary device 55', for example a managed, fixed computing device. Of course, the intermediary device 55' may be another type of device, for example, workspace hub or thin client device. Both the virtual assistant 50' and the intermediary device 55' may be managed by an endpoint management system (e.g., a system that can discover, provision, deploy, update, and troubleshoot endpoint devices within a network), for example, whereby the intermediary device is aware of or has knowledge of the unique identifier of the virtual assistant. The unique identifier of the virtual assistant 50' may be provided to the intermediary device 55' by the endpoint management service at boot time and/or when there is a change to the configuration, for example.

Figure 6:
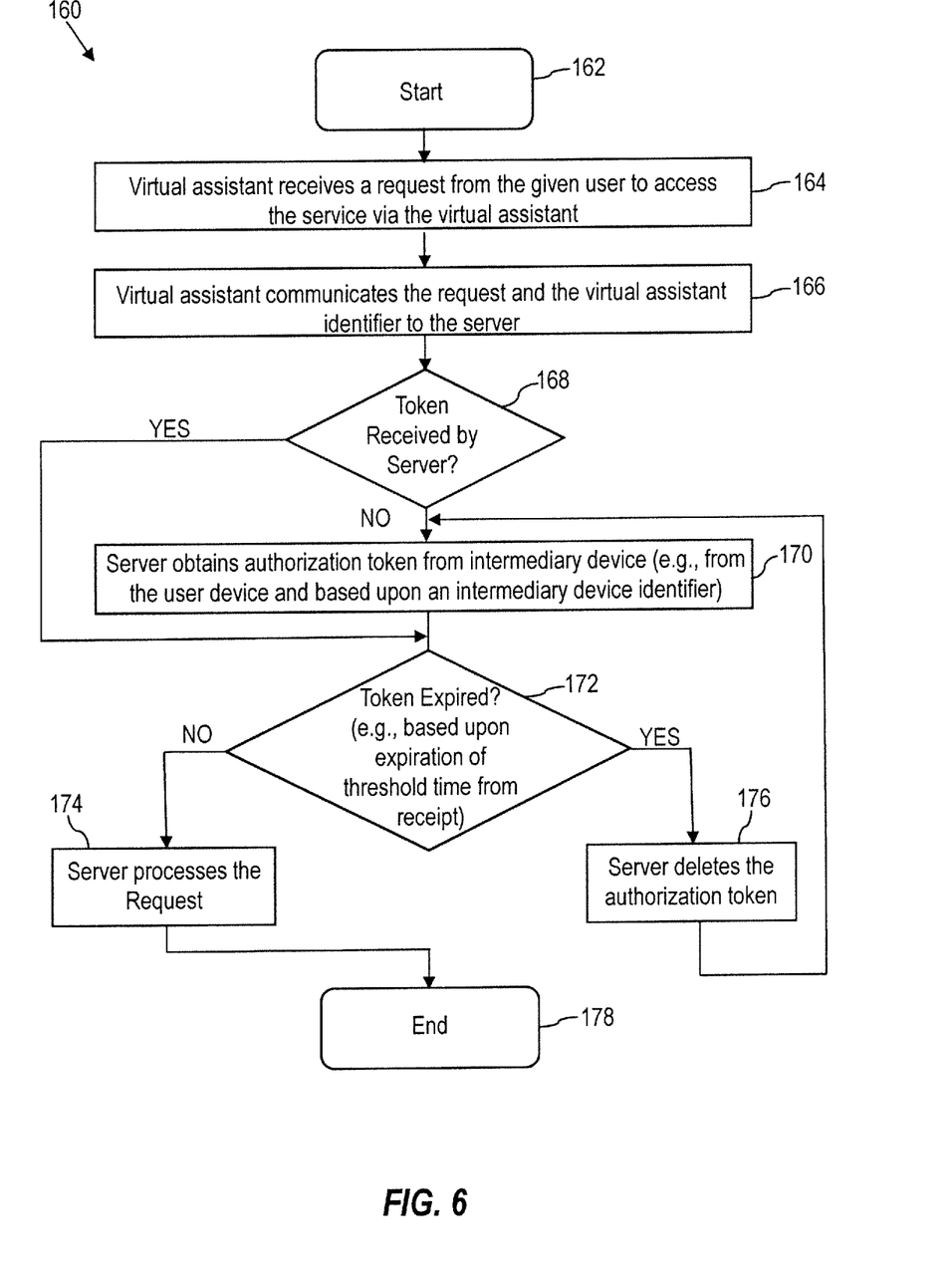
FIG. 6 is a flow diagram illustrating operation of the system of FIG. 5.

Referring now to the flowchart 160 in FIG. 6, beginning at Block 162, the virtual assistant 50' receives a request from the given user 26' to access the service 21' via the virtual assistant (Block 164). The virtual assistant 50' may communicate the request to the server 40' (Block 166).

The server 40', at Block 168, determines whether the authorization token 25' has been received by the server 40' based upon the identifier provided with the request. More particularly, the server 40' or the skill 22' process the request based upon the identifier as will be described in further detail below. The skill 22' performs a lookup or matching operation to determine whether an authorization token 25' for the virtual assistant 50' to access the application 31' is already stored at the server 40'.

If, at Block 168, the server 40' determines that the authorization token 25' has been received by the server 40', the server 40' determines, at Block 172 whether the authorization token has expired, for example, as described above. When the authorization token 25', at Block 172, has not expired, the server 40' processes the request, Block 174. When the authorization token 25' has expired, at Block 172, the server 40' may delete the authorization token (Block 176) and obtain a new authorization token, for example as described herein.

If at Block 168, the server 40' determines that the authorization token 25' has not been received by the server 40', the server 40', at Block 170, obtains the authorization token from the user device 30' via the intermediary device 55' as described below.

The intermediary device 55' has an intermediary device identification associated therewith, for example, a hostname and/or internet protocol (IP) address. An intermediary device 55' may interconnect end devices and provide connectivity and to ensure that data flows across the network. An intermediary device 55' may connect individual hosts to the network and can connect multiple individual networks to form an internetwork.

The intermediary device 55' may broadcast the intermediary device identification, for example, electronically (e.g., wirelessly) and/or visually. More particularly, the intermediary device 55' may advertise or broadcast the intermediary device identification based upon a short-range beacon (e.g., Bluetooth beacon broadcast advertisements) and/or a QR code displayed on a display associated with the intermediary device.

When a given user device 30' is within a relatively close proximity to the intermediary device 55', for example, in the same room or space as the intermediary device, the user device may receive the intermediary device identifier, for example, based upon either or both of receiving the Bluetooth beacon advertisement, or based upon scanning of the QR code via the user device. The application 31' on the user device 30' communicates or sends a message, which includes the authorization token 25', to the intermediary device 55' based on the intermediary device identifier.

The intermediary device 55' passes the authorization token 25' to the server 40' or skill 22' along with the unique identifier associated with the virtual assistant 50'. The skill 22' or server 40' stores the unique identifier of the virtual assistant 50', the authorization token 25', and a threshold expiration time (for example, 15 minutes from the current time).

Upon receiving the authorization token 25' from the intermediary device 55', the server 40' may determine, similarly to that described above, whether the newly obtained authorization token is valid or has not expired (Block 172). If the newly obtained authorization token 25' has not expired (Block 172), the server 40' or service 21' processes the request based upon obtaining the authorization token from the intermediary device 55' (Block 174). More particularly, if the authorization token 25' has not expired, the skill 22' or server 40' then performs the requested action, using the authorization token to call the service APIs as desired. If the authorization token 25' has expired, the authorization token may be deleted (Block 176) and a new authorization token may be obtained, for example as described herein (Block 170). In some embodiments, the server 40' may not determine whether a newly obtained authorization token 25' is valid or has not expired. Operations end at Block 178.

Figure 7:
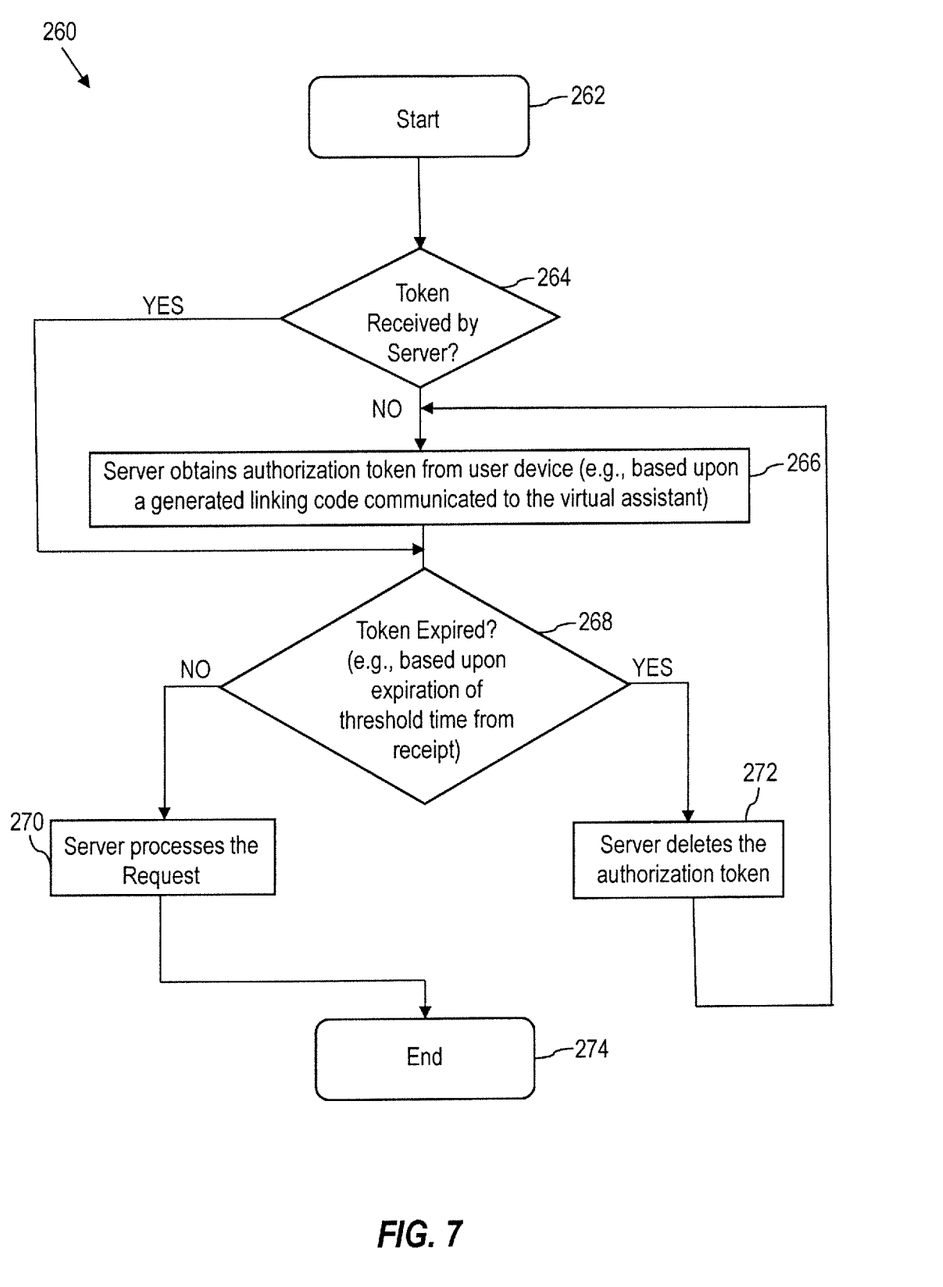
FIG. 7 is another flow diagram illustrating operation of a server of a system for providing a service in accordance with an embodiment.

Referring now to the flowchart 260 in FIG. 7, beginning at Block 262 operations of the system 20 with respect to the server 40 will now be described. Similar to the above embodiments, it should be noted that the operations described herein are based upon the given user 26 having already authenticated themselves to the service 21 using the corresponding application 31 on the user device 30, and therefore the user device possesses the corresponding authorization token 25 that can be used to access the service as the given user (e.g., based upon credentials associated with the given user).

The operations of the server 40 are similar to those described above with respect to FIG. 4. In particular, the server 40, at Block 264, determines whether the authorization token 25 has been received by the server based upon the identifier. If, at Block 264, the server 40 determines that the authorization token 25 has been received by the server 40, the server 40 determines, at Block 268 whether the authorization token has expired. As will be appreciated by those skilled in the art, the authorization token 25 has an expiration associated therewith. When the authorization token 25, at Block 268, has not expired, the server 40 processes the request (Block 270). When the authorization token 25 has expired, at Block 268, the server 40 may delete the authorization token (Block 272) and obtains a new authorization token, for example, as described above.

If at Block 264, the server 40 determines that the authorization token 25 has not been received by the server 40, the server 40 thus does not know which user is making the request, and has no mechanism to authorize access to or fulfill the request or service APIs. Accordingly, at Block 266, the server 40 obtains the authorization token 25 from the user device 30.

Upon receiving the authorization token 25 from the user device 30, the server 40 may determine, similarly to that described above, whether the newly obtained authorization token is valid or has not expired (Block 268). If the newly obtained authorization token 25 has not expired (Block 268), the server 40 or service 21 processes the request based upon receipt of the authorization token from the user device 30 (Block 270). More particularly, if the authorization token 25 has not expired, the skill 22 or server 40 then performs the requested action, using the authorization token to call the service APIs as desired. If the authorization token 25 has expired (Block 268), the authorization token is deleted (Block 272) and a new authorization token may be obtained as described above (Block 266). Operations end at Block 274.

Figure 8:
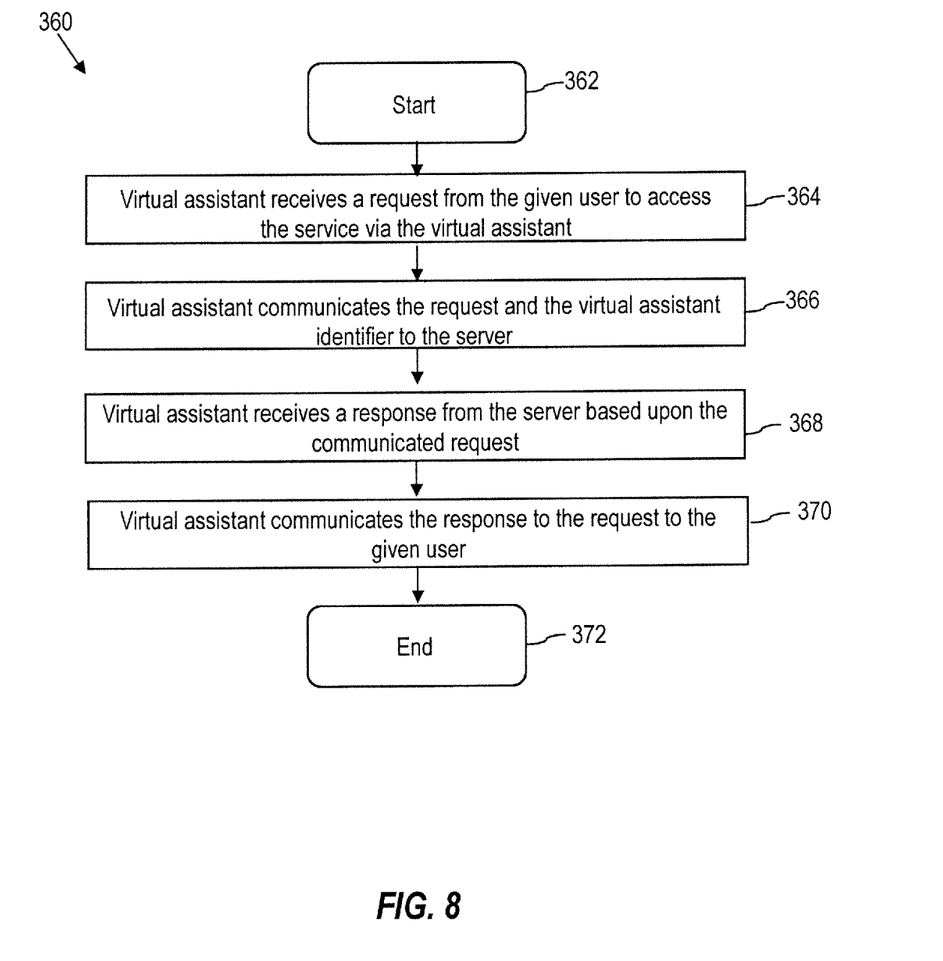
FIG. 8 is another flow diagram illustrating operation of a virtual assistant of a system for providing a service in accordance with an embodiment.

Referring now to the flowchart 360 in FIG. 8, beginning at Block 362 operations of the system 20 with respect to the virtual assistant 50 will now be described. At Block 364, the virtual assistant 50 receives a request from the given user 26 to access the service 21 via the virtual assistant. For example, the given user 26 may audibly request, from the virtual assistant 50, a search of online account files. In other instances, the given user 26 may make the request to interact with the service 21 by audibly speaking, "Virtual Assistant, ask Service Provider A to search my files." The virtual assistant 50 may communicate the request to the server 40, for example, based upon one or more communications networks, such as the Internet (Block 366). At Block 368, the virtual assistant 50 receives a response from the server 40 based upon the communicated request, for example, fulfilling the request from the given user. In the above file searching example, the virtual assistant 50 may receive the results of the search from the server 40. At Block 370, the virtual assistant communicates the response to the request received from the server 40 to the given user. For example, the virtual assistant 50 may audibly provide the response to the given user. The operations end at Block 372. It should be understood that the operations of the server 40 with respect to processing the request are described above.

Figure 9:
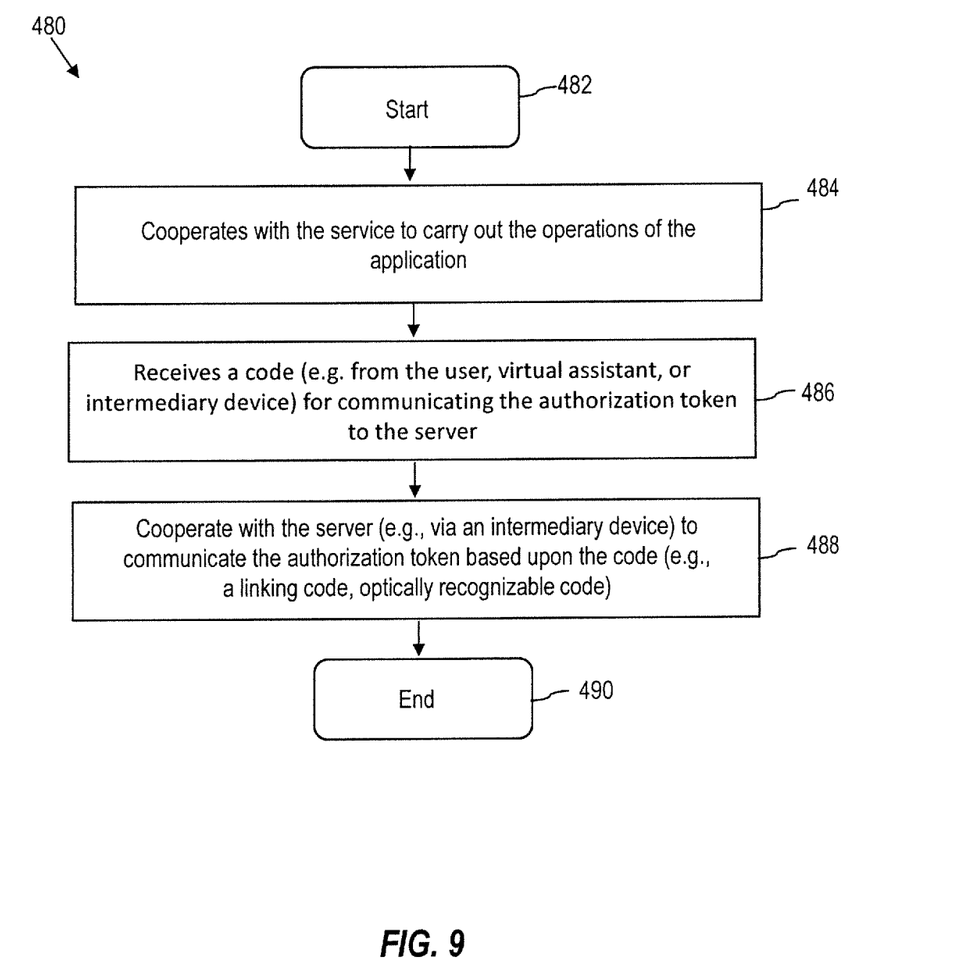
FIG. 9 is another flow diagram illustrating operation of a user device of a system for providing a service in accordance with an embodiment.

Referring now to the flowchart 480 in FIG. 9, operation of an exemplary user device 30 as described herein will now be described. As described above, the user device 30 executes an application 31 (e.g., a file sharing application, such as Dropbox® or Sharefile®). The application 31 has an authorization token 25 associated therewith to authenticate the given user 26 to the service 21. It should be noted that the operations described herein are based upon the given user 26 having already authenticated themselves to the service 21 using the corresponding application 31 on the user device 30, and therefore the user device possesses the corresponding authorization token 25 that can be used to access the service as the given user (e.g., based upon credentials associated with the given user).

Beginning at Block 482, the user device 30, and more particularly, the application 31, cooperates with the service 21 to carry out the operations of the application, for example, based upon the authorization token 25 (Block 484). At Block 486, the user device 30 receives a code, for example, provided by the virtual assistant 50, the given user, or an intermediary device. The code may be in the form an audible instruction, linking code (e.g., manually input), or optically recognizable code (e.g., scanned by the user device). The code may serve as the basis for communicating the authorization token 25 to the server 40. At Block 488, the user device 30 cooperates with the server 40 to communicate the authorization token 25 to the server (Block 486), for example, based upon an audible instruction that may include the linking or short code described above. The user device 30 may also communicate the authorization token 25 to the server 40 based upon an expired authorization token. In one exemplary implementation, the given user 26 may open or execute the application 31 on their user device 30 and select the option to "authorize the skill." The given user 26 may then enter the short code provided by the skill 22 or server 40. In some embodiments, the user device 30 may cooperate with the server 40 to communicate the authorization token 25 based upon a QR code as described above. Operations end at Block 490.

A method aspect is directed to a method of providing a service 21. The method includes using a server 40 to determine whether an authorization token 25 has been received by the server based upon an identifier associated with a virtual assistant 50. The authorization token 25 may be associated with an application 31 cooperating with the service 21 for authenticating a given user 26 to the service and to be executed on a user device 30 associated with the given user from among a plurality thereof, for example, as described above. The method also includes using the server 40 to, when the authorization token 25 has been received by the server, for example, as described with respect to a particular embodiment above, from the intermediary device 55', determine whether the authorization token has expired, and when the authorization token has not expired, process a request from the given user 26 to access the service 21. The request may be from a virtual assistant 50. The method further includes using the server 40 to, when the authorization token 25 has not been received by the server, obtain the authorization token from the user device 30, and process the request based upon obtaining the authorization token from the user device.

A computer readable medium aspect is directed to a non-transitory computer readable medium for providing a service 21. The non-transitory computer readable medium includes computer executable instructions that when executed by a processor 41 cause the processor to perform operations. The operations include determining whether an authorization token 25 has been obtained based upon an identifier associated with a virtual assistant 50. The authorization token 25 may be associated with an application 31 cooperating with the service 21 for authenticating a given user 26 to the service and to be executed on a user device 30 associated with the given user from among a plurality thereof. The operations also include, when the authorization token 25 has been obtained, determining whether the authorization token has expired, and when the authorization token has not expired, processing a request from the given user 26 to access the service 21, the request being from a virtual assistant 50. The operations also include, when the authorization token 26 has not been obtained, obtaining the authorization token from the user device 30, and processing the request based upon obtaining the authorization token from the user device.

While several embodiments have been described herein, it will be appreciated that any element or operation from any embodiment may be used with any one or more elements from any other embodiment or embodiments. Moreover, while operations are described in a particular order, operations may be performed illustrated in another order, for example, concurrently or in parallel with other operations, for example, for a same or given user and/or another user. Many modifications and other embodiments of the disclosure will come to the mind of one skilled in the art having the benefit of the teachings presented in the foregoing descriptions and the associated drawings. Therefore, it is understood that the disclosure is not to be limited to the specific embodiments disclosed, and that modifications and embodiments are intended to be included within the scope of the appended claims.

That which is claimed is:

1. A system for providing a service comprising:
   a user device associated with a given user from among a plurality thereof and executing an application thereon, the application having an authorization token associated therewith to authenticate the given user and the user device to the service;
   a server configured to execute the service for the plurality of users; and
   a virtual assistant having an identifier associated therewith that identifies the virtual assistant, wherein the virtual assistant is configured to
      receive a request from the given user to access the service via the virtual assistant, and
      communicate the request to the server;
   and the server is configured to
      determine whether the authorization token to authenticate the given user and the user device has been received by the server based upon a lookup, by the server, for the identifier identifying the virtual assistant,
      when the authorization token has been received by the server, obtain the authorization token to authenticate the given user and the user device as a result of the lookup, and determine whether the authorization token has expired, and when the authorization token has not expired, process the request, and
      when the authorization token has not been received by the server, obtain the authorization token from the user device, and process the request based upon obtaining the authorization token from the user device.

2. The system of claim 1, wherein the virtual assistant comprises a voice-based virtual assistant.

3. The system of claim 1, wherein the server is configured to, when the authorization token has not been received by the server, generate a linking code and communicate the linking code to the virtual assistant.

4. The system of claim 3, wherein, when the authorization token has not been received by the server,
   the user device is configured to obtain the linking code and communicate the linking code and the authorization token to the server, and
   the server is configured to perform a second lookup to determine whether the identifier identifying the virtual assistant corresponds to the linking code.

5. The system of claim 3, wherein the virtual assistant comprises a voice-based virtual assistant configured to audibly output the linking code.

6. The system of claim 1, wherein the server is configured to determine whether the authorization token has expired based upon expiration of a threshold time from receipt of the authorization token at the server, and when the authorization token has expired, delete the authorization token from the server.

7. The system of claim 1, further comprising an intermediary device configured to cooperate, when the authorization token has not been received by the server, with the user device to obtain the authorization token and communicate the authorization token to the server.

8. The system of claim 7, wherein the intermediary device is configured to communicate an intermediary device identifier; wherein the user device is configured to communicate the authorization token to the intermediary device based upon the intermediary device identifier; and wherein the intermediary device is configured to communicate the received authorization token and the identifier identifying the virtual assistant to the server.

9. The system of claim 8, wherein the intermediary device is configured to display an optically recognizable code corresponding to the intermediary device identifier; and wherein the user device is configured to obtain the intermediary device identifier based upon the optically recognizable code.

10. A server for executing a service, the server comprising:
    a processor and a memory associated with the processor, the processor configured to
       perform a lookup for an identifier associated with a virtual assistant that identifies the virtual assistant;
       determine whether an authorization token has been received by the server based upon the lookup for the identifier of the virtual assistant, the authorization token being associated with an application and for authenticating a given user and a user device to the service, wherein the application is to be executed on the user device, and the user device is associated with the given user from among a plurality thereof, when the authorization token has been received by the server, obtain the authorization token to authenticate the given user and the user device as a result of the lookup, and determine whether the authorization token has expired, and when the authorization token has not expired, process a request from the given user to access the service, the request being from the virtual assistant, and when the authorization token has not been received by the server, obtain the authorization token from the user device, and process the request based upon obtaining the authorization token from the user device.

11. The server of claim 10, wherein the processor is configured to, when the authorization token has not been received by the server, generate a linking code and communicate the linking code to the virtual assistant.

12. The server of claim 11, wherein the virtual assistant comprises a voice-based virtual assistant configured to audibly output the linking code.

13. The server of claim 10, wherein the processor is configured to determine whether the authorization token has expired based upon expiration of a threshold time from receipt of the authorization token at the server, and when the authorization token has expired, delete the authorization token from the server.

14. The server of claim 10, wherein the processor is configured to obtain the authorization token and the identifier identifying the virtual assistant from an intermediary device.

15. A method of providing a service via a server, the method comprising:
  receiving, by the server, a request for a given user from among a plurality thereof to access the service via a virtual assistant;
  performing, by the server, a lookup for an identifier associated with the virtual assistant that identifies the virtual assistant;
  determining, by the server, that an authorization token has not been obtained based upon the lookup for the identifier of the virtual assistant, the authorization token being associated with an application and for authenticating a given user and a user device to the service, wherein the application is to be executed on the user device, and the user device is associated with the given user;
  obtaining the authorization token from the user device in response to determining that the authorization token has not been obtained; and
  processing the request based upon obtaining the authorization token from the user device.

16. The method of claim 15, wherein receiving the request comprises receiving the request from a voice-based virtual assistant configured to audibly output a linking code.

17. The method of claim 16, further comprising:
  determining that the authorization token has expired based upon expiration of a threshold time from receipt of the authorization token at the server; and
  deleting the authorization token from the server in response to determining that the authorization token has expired.

18. The method of claim 17, wherein determining that the authorization token has expired comprises determining that the authorization token has expired based upon expiration of a threshold time from receipt of the authorization token at the server.

19. The method of claim 15, wherein obtaining the authorization token from the user device comprises either generating a linking code and communicating the linking code to the virtual assistant or receiving the authorization token and the identifier identifying the virtual assistant from an intermediate device.

20. A non-transitory computer readable medium for providing a service, the non-transitory computer readable medium comprising computer executable instructions that when executed by a processor cause the processor to provide a service, the computer executable instructions comprising instructions to:
  determine whether an authorization token has been received based upon a lookup, by a server, for an identifier identifying a virtual assistant, the authorization token being associated with an application and for authenticating a given user and a user device to the service, wherein the application is to be executed on the user device, and the user device is associated with the given user from among a plurality thereof,
  when the authorization token has been received, obtain the authorization token to authenticate the given user and the user device as a result of the lookup, and determine whether the authorization token has expired, and when the authorization token has not expired, process a request from the given user to access the service, the request being from the virtual assistant, and
  when the authorization token has not been received, obtain the authorization token from either the user device or an intermediary device, and process the request based upon obtaining the authorization token from the user device or intermediary device.

21. The non-transitory computer readable medium of claim 20, wherein the instructions comprise instructions to generate, when the authorization token has not been obtained, a linking code and communicate the linking code to the virtual assistant.

22. The non-transitory computer readable medium of claim 20, wherein the instructions comprise instructions to determine whether the authorization token has expired based upon expiration of a threshold time from receipt of the authorization token and when the authorization token has expired, deleting the authorization token.

23. The non-transitory computer readable medium of claim 20, wherein the instructions comprise instructions to obtain the authorization token and the identifier identifying the virtual assistant from the intermediary device.

* * * * *